(12) United States Patent
Dec

(10) Patent No.: US 10,995,829 B2
(45) Date of Patent: May 4, 2021

(54) TENSIONER

(71) Applicant: Gates Corporation, Denver, CO (US)

(72) Inventor: Andrzej Dec, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 250 days.

(21) Appl. No.: 15/625,635

(22) Filed: Jun. 16, 2017

(65) Prior Publication Data
US 2018/0363741 A1    Dec. 20, 2018

(51) Int. Cl.
*F16H 7/12* (2006.01)
*F16H 7/08* (2006.01)

(52) U.S. Cl.
CPC ..... *F16H 7/1281* (2013.01); *F16H 2007/081* (2013.01); *F16H 2007/0865* (2013.01); *F16H 2007/0872* (2013.01); *F16H 2007/0893* (2013.01)

(58) Field of Classification Search
CPC .......... F16H 2007/081; F16H 7/1218; F16H 7/1281; F16H 2007/0893; F16H 2007/0846
USPC ................................. 474/112, 135
See application file for complete search history.

(56) References Cited

U.S. PATENT DOCUMENTS

| | | | |
|---|---|---|---|
| 4,689,037 A * | 8/1987 | Bytzek ................ | F16H 7/1218 474/135 |
| 5,011,460 A * | 4/1991 | Ouchi .................. | F16H 7/1245 474/133 |
| 5,055,088 A | 10/1991 | Cradduck et al. | |
| 5,057,059 A * | 10/1991 | Sidwell ................ | F16H 7/1218 474/135 |
| 5,421,788 A * | 6/1995 | Toth ..................... | F16C 13/006 474/135 |
| 5,478,285 A * | 12/1995 | Bakker ................. | F16H 7/1218 474/135 |
| 5,795,257 A * | 8/1998 | Giese ................... | F16H 7/1218 474/109 |
| 5,919,107 A * | 7/1999 | Stepniak ............... | F16H 7/1281 474/112 |
| 5,967,919 A * | 10/1999 | Bakker ................. | F16H 7/1218 474/94 |

(Continued)

FOREIGN PATENT DOCUMENTS

| DE | 19907668 A1 | 8/2000 |
|---|---|---|
| DE | 102009012713 A1 | 9/2010 |

(Continued)

OTHER PUBLICATIONS

European Patent Office, International Search Report and the Written Opinion of the International Searching Authority; application No. PCT/US2018/037841, dated Aug. 13, 2018.

(Continued)

*Primary Examiner* — Henry Y Liu
(74) *Attorney, Agent, or Firm* — Alyssa K. Sandrowitz, Esq.

(57) ABSTRACT

A tensioner comprising a base having a cylindrical portion extending axially, the cylindrical portion comprising a radially outer surface and a receiving portion that is radially inward of the radially outer surface, an eccentric arm pivotally engaged with the radially outer surface, a torsion spring disposed within the radially inward receiving portion, the torsion spring applying a biasing force to the eccentric arm, and a pulley journalled to the eccentric arm.

8 Claims, 6 Drawing Sheets

(56) References Cited

U.S. PATENT DOCUMENTS

| | | |
|---|---|---|
| 6,364,796 B1 | 4/2002 | Nakamura et al. |
| 6,524,202 B1 | 2/2003 | Tada et al. |
| 6,592,482 B2 | 7/2003 | Serkh |
| 6,620,067 B1 | 9/2003 | Nakamura et al. |
| 6,808,467 B2 | 10/2004 | Takeda et al. |
| 6,902,505 B2 | 6/2005 | Yonezawa et al. |
| 6,932,731 B2 * | 8/2005 | Kaiser ................ F16H 7/1218 474/112 |
| 7,320,262 B2 * | 1/2008 | Hallen ................. F16H 7/129 74/113 |
| 7,384,355 B2 * | 6/2008 | Ayukawa ............ F16H 7/1218 474/109 |
| 7,497,794 B2 * | 3/2009 | Lannutti ............. F16H 7/1218 474/133 |
| 7,637,829 B2 * | 12/2009 | Stone ................. F16H 7/1281 474/109 |
| 7,887,445 B2 * | 2/2011 | Quintus ............. F16H 7/1218 474/109 |
| 7,901,309 B2 | 3/2011 | Lehtovaara et al. |
| 7,946,938 B2 * | 5/2011 | Hallen ............... F16H 7/1218 474/112 |
| 7,951,030 B2 | 5/2011 | Ward et al. |
| 8,272,983 B2 | 9/2012 | Rolando et al. |
| 8,292,765 B2 * | 10/2012 | Rolando ............ F16H 7/1245 184/6.17 |
| 8,475,308 B2 * | 7/2013 | Crist ................. F16H 7/1218 474/135 |
| 8,617,013 B2 * | 12/2013 | Ferguson ........... F16H 7/1218 474/135 |
| 8,690,718 B2 * | 4/2014 | Cantatore .......... F16H 7/1281 474/101 |
| 8,926,462 B2 * | 1/2015 | Ward .................. F16H 7/12 474/112 |
| 8,932,163 B2 * | 1/2015 | Fittro ................. F16H 7/1281 474/135 |
| 9,523,413 B2 | 12/2016 | Kurematsu et al. |
| 9,618,098 B2 | 4/2017 | Ward et al. |
| 9,777,806 B2 * | 10/2017 | Dutil .................. F16H 7/1218 |
| 2002/0107097 A1 | 8/2002 | Takeda |
| 2002/0119850 A1 * | 8/2002 | Dutil .................. F16H 7/1218 474/135 |
| 2006/0068957 A1 * | 3/2006 | Stone ................. F16H 7/1281 474/135 |
| 2006/0100049 A1 * | 5/2006 | Lannutti ............. F16H 7/1218 474/133 |
| 2007/0099736 A1 | 5/2007 | Hallen |
| 2008/0171622 A1 * | 7/2008 | Schever ................ F16F 1/042 474/135 |
| 2010/0144473 A1 * | 6/2010 | Ward ................... F16H 7/1218 474/112 |
| 2010/0190594 A1 * | 7/2010 | Rolando .............. F16H 7/1218 474/112 |
| 2011/0218066 A1 * | 9/2011 | Rolando .............. F16H 7/1245 474/113 |
| 2012/0316018 A1 * | 12/2012 | Ward ................... F16H 7/1218 474/135 |
| 2012/0316019 A1 * | 12/2012 | Ward ................... F16H 7/1218 474/135 |
| 2014/0287859 A1 * | 9/2014 | Frankowski .......... F02B 67/06 474/135 |
| 2015/0219189 A1 | 8/2015 | Serkh et al. |
| 2017/0016517 A1 | 1/2017 | Ward et al. |
| 2017/0023108 A1 | 1/2017 | Bauerdick et al. |
| 2018/0320764 A1 | 11/2018 | Frankowski |

FOREIGN PATENT DOCUMENTS

| | | |
|---|---|---|
| DE | 1102009057331 A1 | 6/2011 |
| DE | 102014209780 A1 | 11/2015 |
| JP | 53-081019 A | 7/1978 |
| JP | 3-110243 | 11/1991 |
| JP | 2005164024 A | 6/2005 |
| JP | 2005273896 A | 10/2005 |
| WO | 2006024170 A1 | 3/2006 |
| WO | 2006099724 A1 | 9/2006 |
| WO | 2008149390 A1 | 12/2008 |
| WO | 2015167602 A1 | 11/2015 |
| WO | 2017070784 A1 | 5/2017 |
| WO | 2018003746 A1 | 1/2018 |
| WO | 2018080970 A1 | 5/2018 |
| WO | 2018232295 A1 | 12/2018 |

OTHER PUBLICATIONS

Australian Government IP Australia, Examination Report No. 1 for standard patent application, Application No. 2018274947, dated Jun. 13, 2019.

Australian Government IP Australia, Examination Report No. 1 for standard patent application, Application No. 2018283309 dated Jun. 13, 2019.

Canadian Intellectual Property Office, Examination Report, Application No. 3026671 dated Sep. 20, 2019.

Canadian Intellectual Property Office, Examination Report, Application No. 3033096 dated Jan. 17, 2020.

* cited by examiner

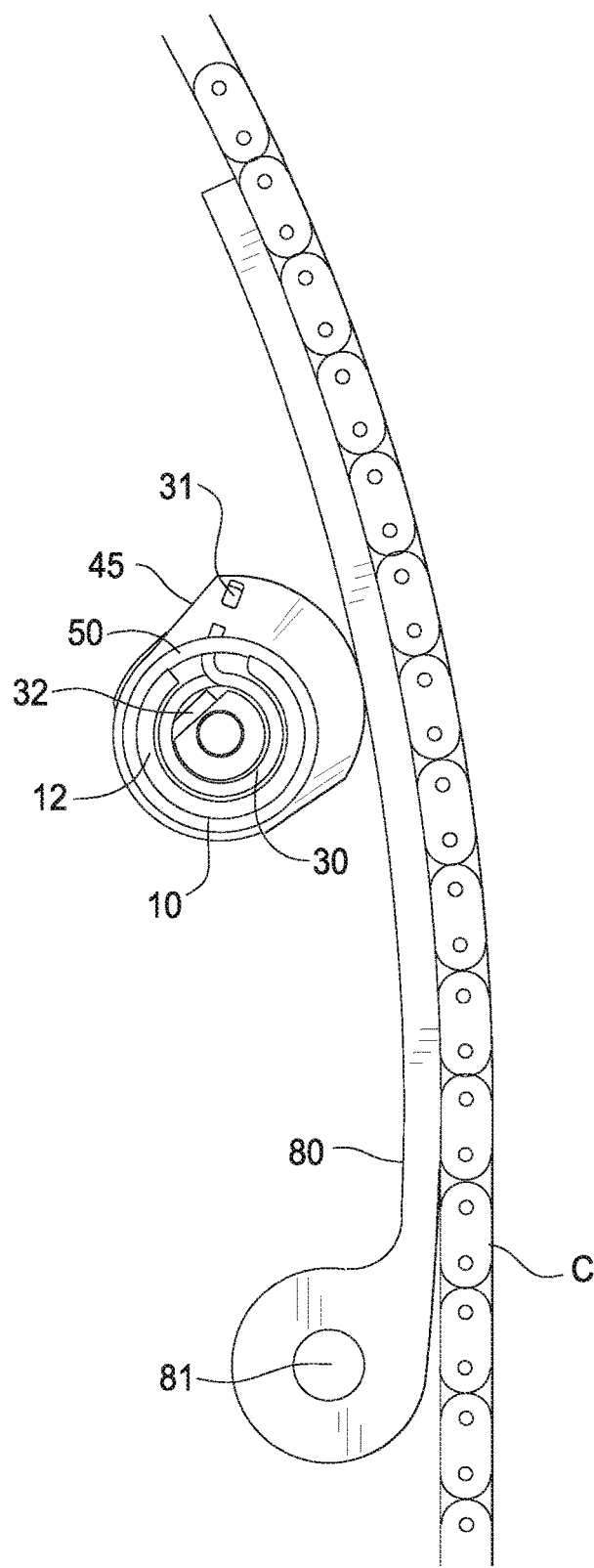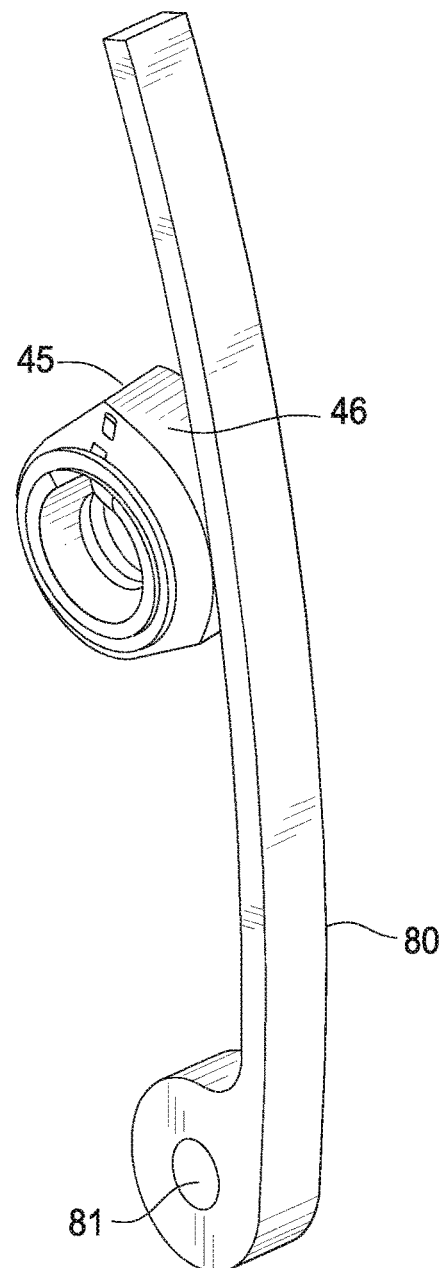
FIG.10
FIG.11

TENSIONER

FIELD OF THE INVENTION

The invention relates to a tensioner, and more particularly, to a tensioner having a torsion spring disposed within a radially inward receiving portion of a base cylindrical portion.

BACKGROUND OF THE INVENTION

The two most common methods synchronously driving rotating members such as cam shafts and balance shafts from a crankshaft are timing chains and belts. Timing chains require engine oil to operate. In comparison most timing belt applications require that no oil be present in the belt drive as the presence of oil can damage the belt and inhibit its intended purpose. Recent improvements in belts no long require that a belt be isolated from the engine oil environment.

The recent improvement of belts to operate in oil, however poses other problems that need to be solved. One specific problem is properly tensioning the belt drive to keep the camshaft synchronized with the crankshaft. Should the camshaft or other synchronized driven crankshaft component loose synchronization with the crankshaft catastrophic engine damage can result.

To transmit power through the belt from the rotating crankshaft one side of the belt is pulled around the crankshaft and is commonly referred to as the belt tight side by those skilled in the art. Conversely the other side is referred to as the belt slack side, since the belt is being "pushed" away from the crankshaft. It is important to provide tensioning to the slack side of the belt to prevent the belt from becoming unduly slack and thus causing a loss of synchronization between the crankshaft and the components rotated by the crankshaft. This loss of synchronization is commonly referred to as "tooth jump" or "ratcheting" by those skilled in the art.

Known tensioners are constrained in size based on the arrangement of the components. Typically a torsion spring is stacked axially with a pulley bearing. This limits the minimum height of the device, which in turn affects the engine and belt system design.

Representative of the art is U.S. Pat. No. 9,618,098 which discloses a tensioner comprising a base, a shaft connected to the base, an eccentric adjuster coaxially engaged with the shaft, an arm pivotally engaged with the shaft, a pulley journalled to the arm, a torsion spring engaged between the arm and the base, the arm comprising a first receiving portion and a second receiving portion disposed axially opposite from the first receiving portion, a first damping member disposed between the arm and the base, the first damping member frictionally engaged with the base and engaged with first receiving portion, a second damping member disposed between the arm and the eccentric adjuster having a member engaged with the second receiving portion, and a biasing member disposed between the first damping member and the arm for applying a normal force to the first damping member and to the second damping member.

What is needed is a tensioner having a torsion spring disposed within a radially inward receiving portion of a base cylindrical portion. The present invention meets this need.

SUMMARY OF THE INVENTION

The primary aspect of the invention is to provide a tensioner having a torsion spring disposed within a radially inward receiving portion of a base cylindrical portion.

Other aspects of the invention will be pointed out or made obvious by the following description of the invention and the accompanying drawings.

The invention comprises a tensioner comprising a base having a cylindrical portion extending axially, the cylindrical portion comprising a radially outer surface and a receiving portion that is radially inward of the radially outer surface, an eccentric arm pivotally engaged with the radially outer surface, a torsion spring disposed within the radially inward receiving portion, the torsion spring applying a biasing force to the eccentric arm, and a pulley journalled to the eccentric arm.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 10 is a side view of an alternate embodiment.
FIG. 11 is a perspective view of an alternate embodiment in FIG. 10.

DETAILED DESCRIPTION OF THE PREFERRED EMBODIMENT

Figure 1:
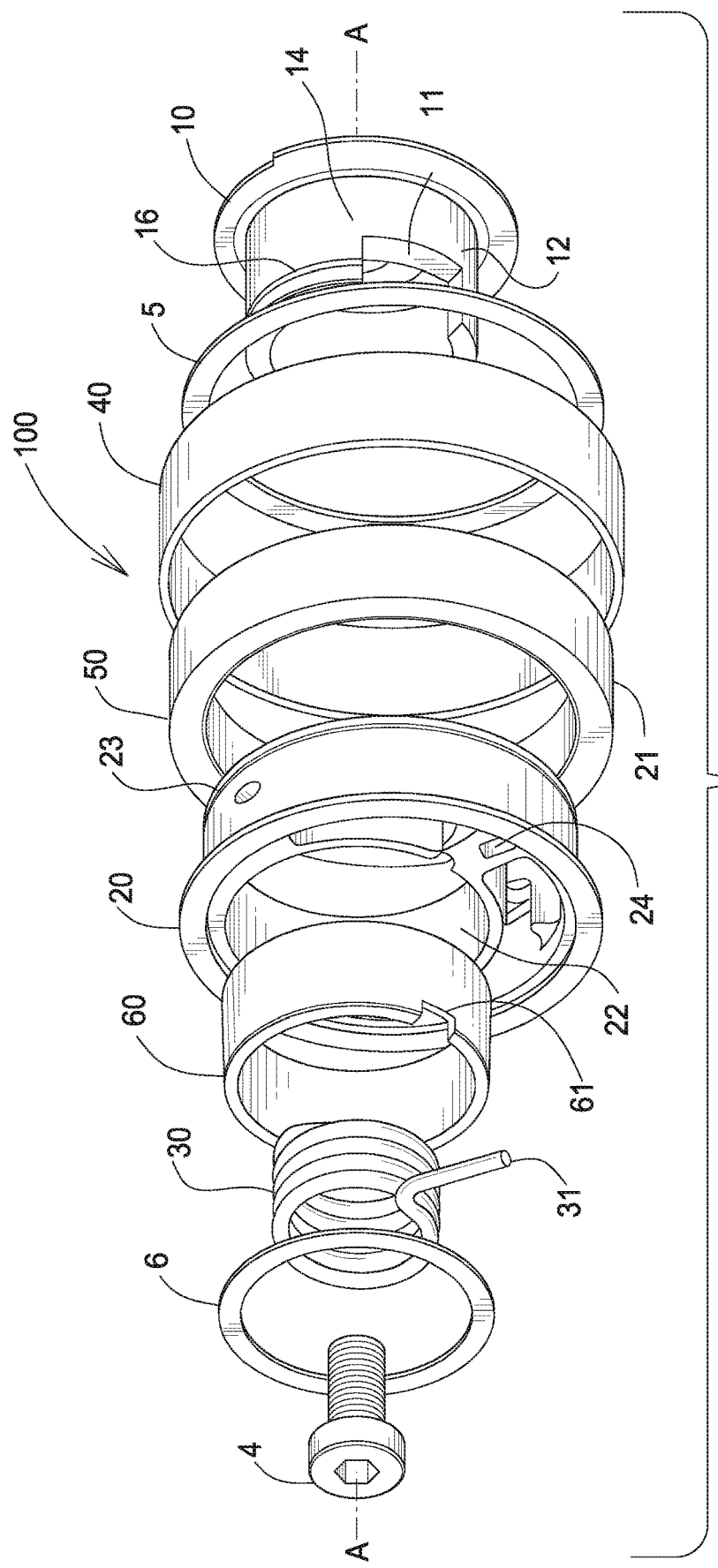
FIG. 1 is an exploded view of the tensioner.

FIG. 1 is an exploded view of the tensioner. Tensioner 100 comprises a base 10. Base 10 comprises an axially extending cylindrical portion 12 having an outer surface 14. Cylindrical portion 12 further comprises an opening 11 and a receiving portion 18.

Eccentric arm 20 pivots about cylindrical portion 12. Bushing 60 is disposed between inner surface 22 and outer surface 14. Bushing 60 comprises a slot 61 which substantially aligns with opening 11 in cylindrical portion 12. Pulley 40 is journalled to surface 21 on a needle bearing 50. A needle bearing is used in an oil bath environment. Other bearings known in the art are suitable as well.

Torsion spring 30 engages and biases eccentric arm 20 toward a belt (not shown) in order to apply a belt load. End 31 projects through slot 61 and opening 11 to engage eccentric arm 20 receiving portion 24. End 32 engages a receiving portion 15 in base 10. Torsion spring 30 is entirely disposed within receiving portion 18. Receiving portion 18 is a central hollow portion of cylindrical portion 12. Torsion spring 30 is coplanar with bearing 50, pulley 40 and eccentric arm 20. Torsion spring 30 is disposed radially inward of pulley 40, bearing 50, bushing 60 and cylindrical portion 12. Namely, torsion spring 30, bearing 50, pulley 40 and eccentric arm 20 are all concentrically arranged such that no one of the listed components is axially displaced, along axis A-A, from the others.

Retaining ring 6 engages circumferential slot 16 in base 10. Retaining ring 5 engages circumferential slot 23 in eccentric arm 20. Retaining ring 5 retains bearing 50 on eccentric arm 20. Retaining ring 6 retains eccentric arm 20 on base 10. In the presence of oil retaining ring 5 and 6 can each act as a thrust washer to transmit axial forces.

Pulley 40 is press fit on bearing 50. Fastener 4 projects through torsion spring 30 and hole 17 in base 10 to fix tensioner 100 to a mounting surface such as an engine (not shown).

Figure 2:
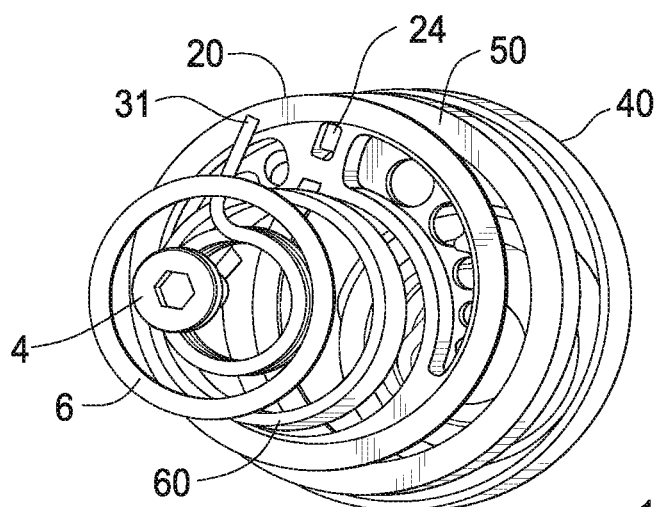
FIG. 2 is a top exploded view.

FIG. 2 is a top exploded view. Eccentric arm 20 pivots about the axis A-A, which axis is centered on cylindrical portion 12 and projects through fastener 4. Eccentric arm 20 pivots about axis A-A. Pulley 40 rotates about "B" which is the geometric center of eccentric arm 20. "B" is offset eccentrically from axis A-A thereby allowing eccentric pivotal movement of eccentric arm 20 which in turn allows tensioner 100 to apply a variable load to a belt (not shown).

Figure 3:
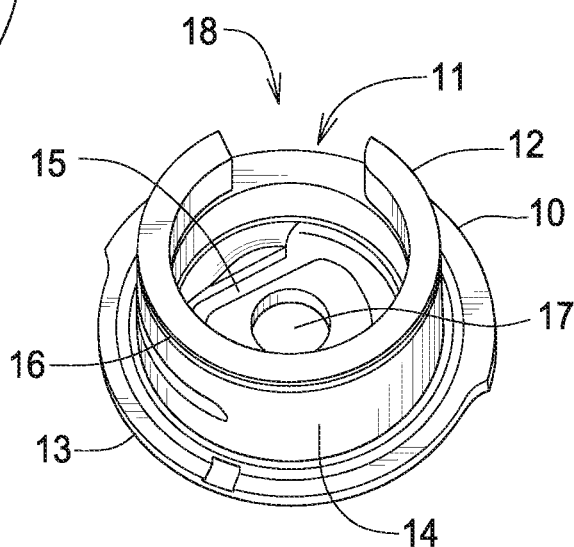
FIG. 3 is a perspective view of the base.

FIG. 3 is a perspective view of the base. End receiving portion 15 is disposed at one end of receiving portion 18 in base 10. End 32 engages receiving portion 15 thereby fixing end 32 and acting as a reaction point for the torsion spring.

Figure 4:
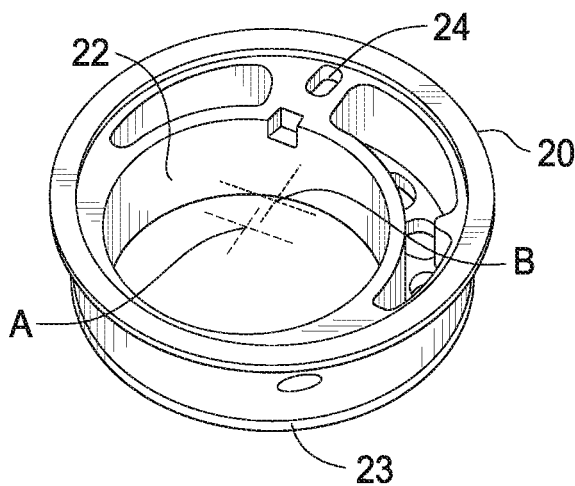
FIG. 4 is a perspective view of the eccentric arm.

FIG. 4 is a perspective view of the eccentric arm. "B" is the geometric center of pulley 20 and is the point about which pulley 40 rotates. Eccentric arm 20 pivots about "A" on axis A-A. Receiving portion 24 engages end 31 of spring 30.

Figure 5:
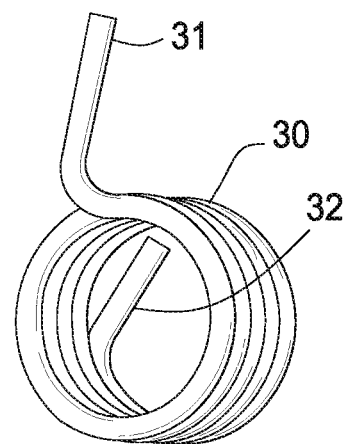
FIG. 5 is a perspective view of the torsion spring.

FIG. 5 is a perspective view of the torsion spring. End 31 projects into receiving portion 24 of eccentric arm 20. End 32 engages receiving portion 15.

Figure 6:
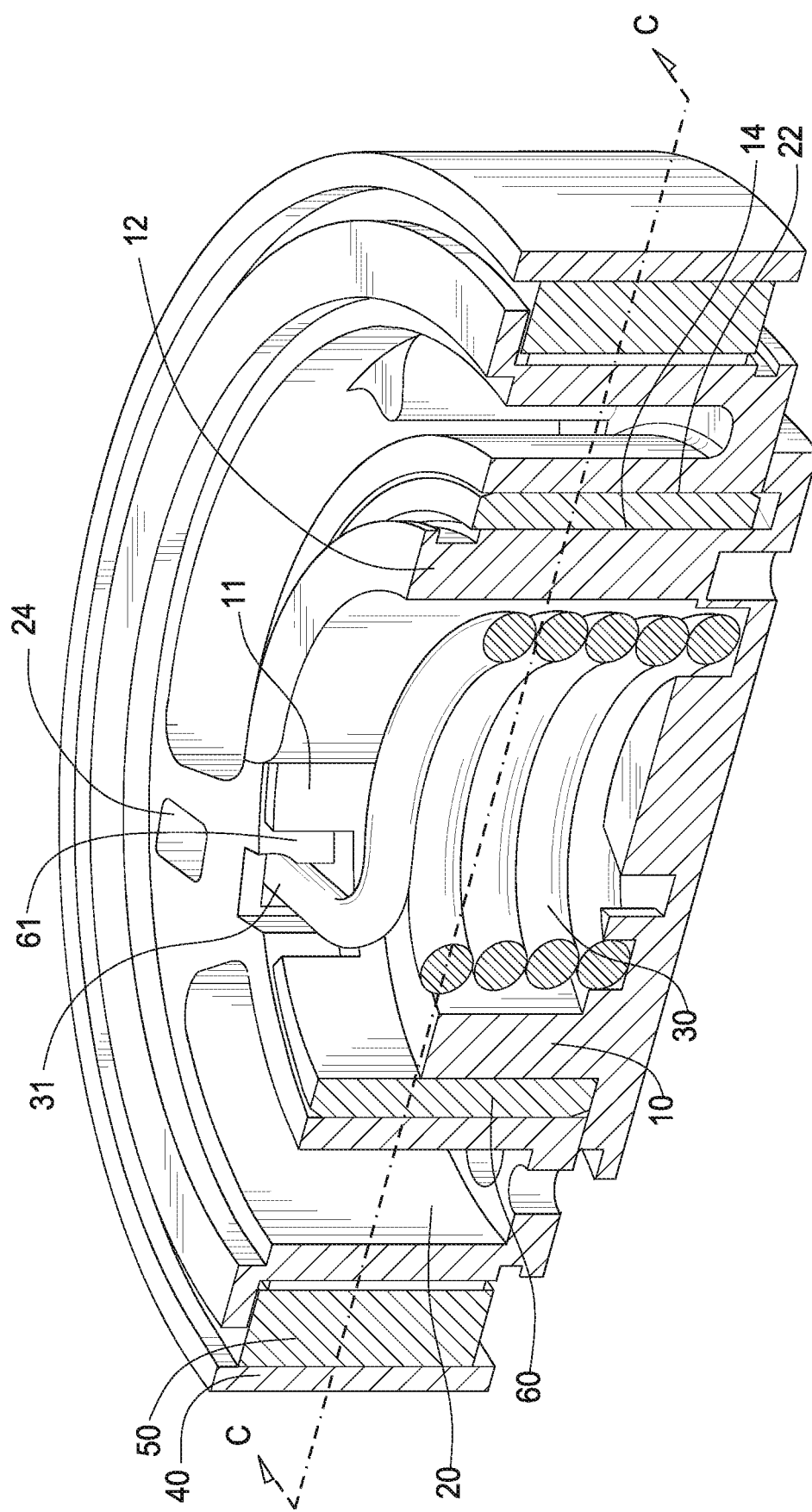
FIG. 6 is a cross-sectional view of the tensioner.

FIG. 6 is a cross-sectional view of the tensioner. Torsion spring 30, bushing 60, cylindrical portion 12, eccentric arm 20, bearing 50 and pulley 40 are all concentrically arranged such that no one of the listed components is axially displaced, along axis A-A, from the others. This fully concentric and nested arrangement minimizes the height of the tensioner allowing it to be used in very cramped applications.

Figure 7:
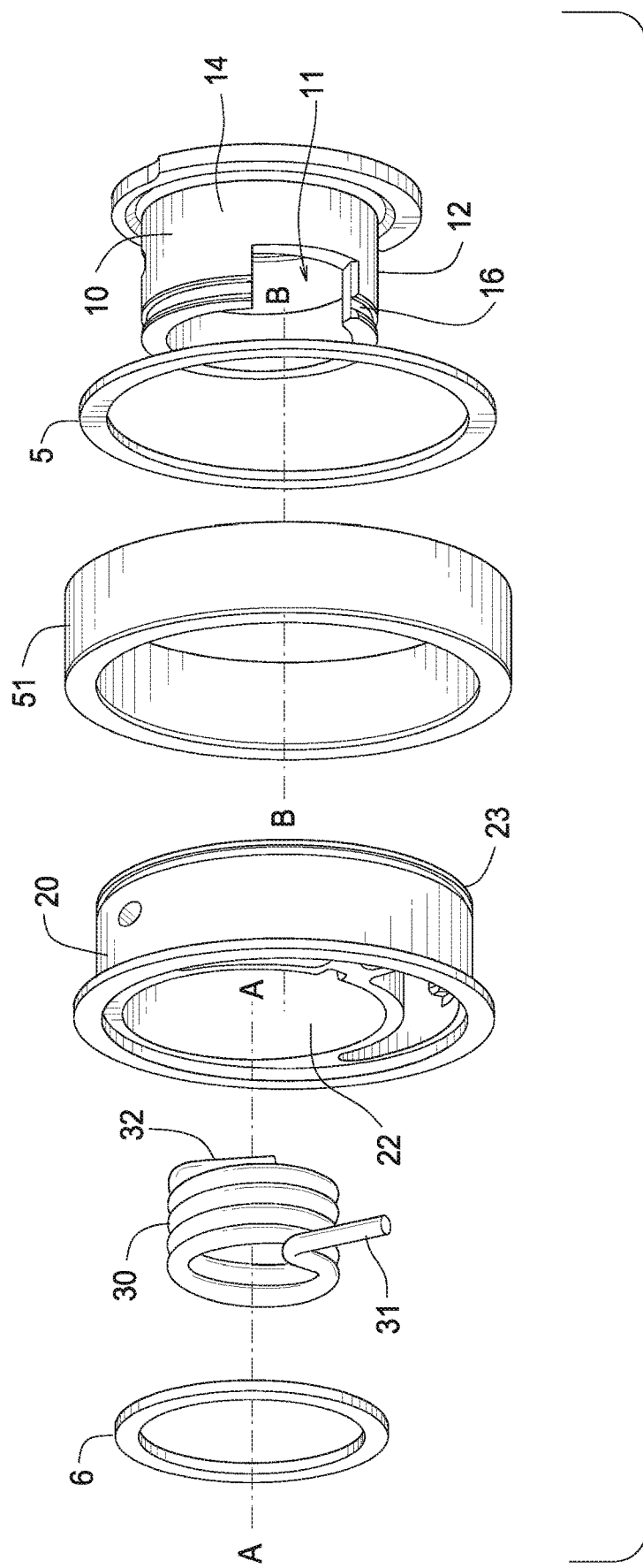
FIG. 7 is an exploded view of an alternate embodiment.

FIG. 7 is an exploded view of an alternate embodiment. The components are the same as described herein, with the exception that the bearing 51 is a plain bearing and bushing 60 is omitted. This alternate embodiment is configured to run in oil and/or is served with oil splash lubrication. Eccentric arm 20 pivots about axis A-A. Pulley 40 rotates about axis B-B see FIG. 4. Axis A-A is disposed away from axis B-B, and hence is not coaxial with axis A-A thereby allowing eccentric pivotal movement of eccentric arm 20.

Figure 8:
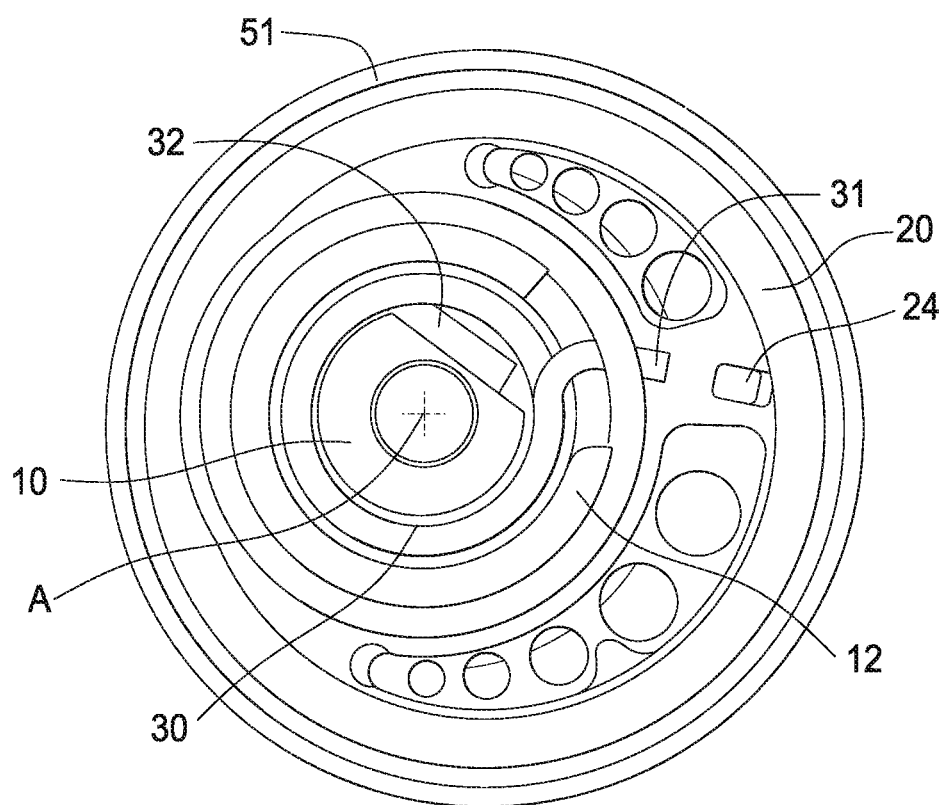
FIG. 8 is a top view of an alternate embodiment.

FIG. 8 is a top view of an alternate embodiment.

Figure 9:
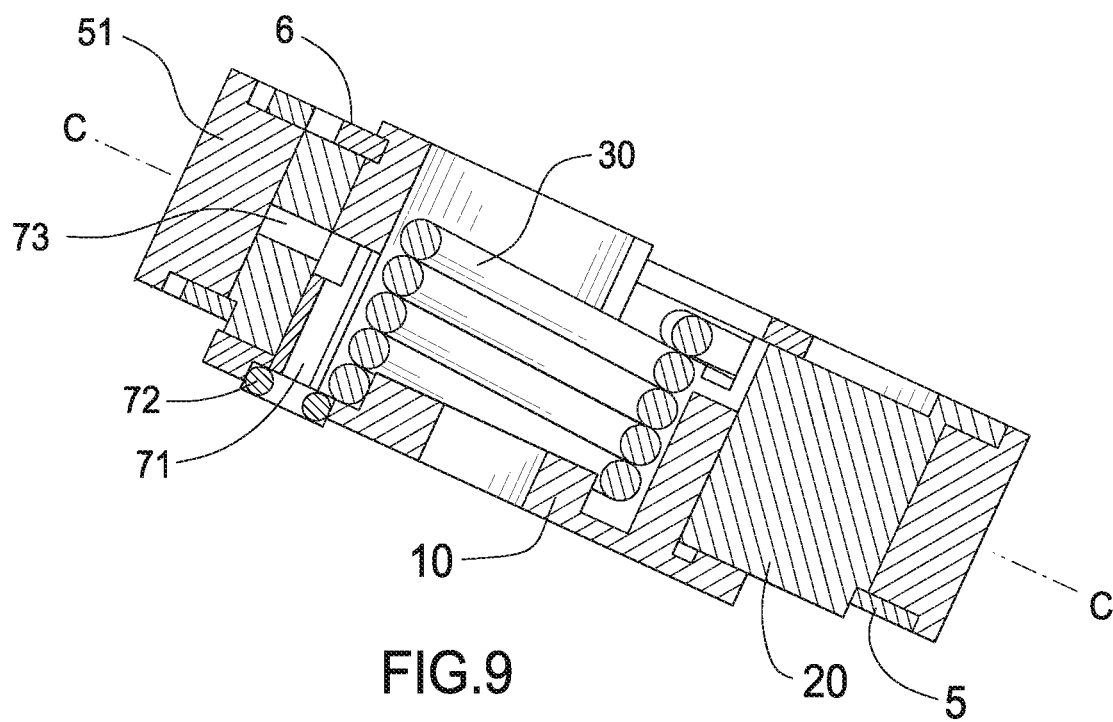
FIG. 9 is a cross-sectional view of an alternate embodiment.

FIG. 9 is a cross-sectional view of the alternate embodiment. Torsion spring 30, eccentric arm 20 and bearing 51 are concentrically arranged such that no one of the listed components is axially displaced, along axis A-A, from the others. Fluid conduit 71 in base 10 provides a path for a fluid such as oil to flow from the engine oil system (not shown) to bearing 51 via fluid conduit 73, thereby lubricating the bearing. O-ring 72 provides means to seal the connection to the engine oil system.

FIG. 10 is a side view of an alternate embodiment. Instead of an eccentric arm 20 and pulley 40, this alternate embodiment comprises a cam 45. Cam 45 operates on the same principle as eccentric arm 20 and it occupies the same position in the device. There is no pulley 40. Cam 45 engages an elongate member 80. Elongate member 80 may comprise any suitable low friction material known in the art. Elongate member 80 may also be referred to as a slide guide. A chain "C" slidingly engages a surface of slide guide 80. Pivot 81 is disposed at one end of the slide guide. Slide guide 80 pivots about pivot 81 in response to rotation of cam 45. Due to the eccentric form of surface 46 rotation of cam 45 causes slide guide 80 to pivot about 81 thereby maintaining a load on chain "C". This embodiment is useful in an internal combustion engine timing system by way of example.

FIG. 11 is a perspective view of the alternate embodiment in FIG. 10. Surface 46 of cam 45 engages slide guide 80.

Although forms of the invention have been described herein, it will be obvious to those skilled in the art that variations may be made in the construction and relation of parts and method without departing from the spirit and scope of the invention described herein.

I claim:

1. A tensioner comprising:
   a base having a cylindrical portion extending axially, the cylindrical portion comprising a radially outer surface and a receiving portion that is radially inward of the radially outer surface and an opening in the cylindrical portion;
   an eccentric arm pivotally engaged with the radially outer surface;
   a torsion spring disposed within the radially inward receiving portion and comprising an end projecting through the opening to engage the eccentric arm, the torsion spring thereby applying a biasing force to the eccentric arm; and
   a pulley journalled to the eccentric arm, the pulley concentrically arranged with an eccentric arm geometric center B-B.

2. The tensioner as in claim 1, wherein the pulley is journalled on a needle bearing.

3. The tensioner as in claim 1, wherein the eccentric arm, the pulley and the torsion spring are concentrically arranged such that no one of the eccentric arm, pulley or torsion spring is axially displaced along an axis A-A from the others.

4. The tensioner as in claim 1, wherein the eccentric arm is journalled to the base on a bushing.

5. A tensioner comprising:
   a base having a cylindrical portion extending axially, the cylindrical portion comprising a radially outer surface and a radially inward receiving portion and an opening in the cylindrical portion;
   an eccentric arm pivotally engaged with the radially outer surface;
   a torsion spring disposed within the radially inward receiving portion and comprising an end projecting through the opening to engage the eccentric arm, the torsion spring applying a biasing force to the eccentric arm;
   a pulley journalled to the eccentric arm; and
   wherein the eccentric arm, the pulley and the torsion spring are nested such that no one of the eccentric arm, pulley or torsion spring is axially displaced along an axis A-A from either of the eccentric arm, pulley or torsion spring.

6. The tensioner as in claim 5, wherein the base further comprises a fluid conduit whereby a fluid may access the bearing.

7. The tensioner as in claim 5, wherein the pulley is journalled to the eccentric arm on a bearing.

8. The tensioner as in claim 7, wherein the bearing comprises a needle bearing.

* * * * *